United States Patent
Hanazawa et al.

(10) Patent No.: US 6,665,030 B2
(45) Date of Patent: Dec. 16, 2003

(54) LIQUID CRYSTAL DISPLAY DEVICE WITH PROJECTION-RECESS PATTERNS FORMED IN PIXEL REGIONS FOR REFLECTING INCIDENT LIGHT

(75) Inventors: Yasuyuki Hanazawa, Fukaya (JP); Kohei Nagayama, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 54 days.

(21) Appl. No.: 10/024,372

(22) Filed: Dec. 21, 2001

(65) Prior Publication Data

US 2002/0113926 A1 Aug. 22, 2002

(30) Foreign Application Priority Data

Dec. 26, 2000 (JP) .......................... 2000-395931
Dec. 10, 2001 (JP) .......................... 2001-376016

(51) Int. Cl.[7] .......................... G02F 1/1335
(52) U.S. Cl. .......................... 349/113
(58) Field of Search .......................... 349/113, 106

(56) References Cited

U.S. PATENT DOCUMENTS

| | | | |
|---|---|---|---|
| 5,408,345 A | | 4/1995 | Mitsui et al. |
| 5,610,741 A | * | 3/1997 | Kimura ............ 349/113 |
| 6,097,459 A | * | 8/2000 | Shimada et al. ...... 349/113 |
| 6,259,500 B1 | * | 7/2001 | Kijima et al. ........ 349/113 |
| 6,313,895 B1 | * | 11/2001 | Tsuda et al. ........ 349/113 |
| 6,342,935 B1 | * | 1/2002 | Jang et al. .......... 349/113 |
| 2001/0004276 A1 | * | 6/2001 | Urabe et al. ........ 349/106 |

* cited by examiner

Primary Examiner—Carl Whitehead, Jr.
Assistant Examiner—Stephen W. Smoot
(74) Attorney, Agent, or Firm—Pillsbury Winthrop LLP

(57) ABSTRACT

A liquid crystal display device comprises array and counter substrates, a liquid crystal layer held between the array and counter substrates and partitioned into a plurality of pixel regions in each of which the alignment of liquid crystal molecules is controlled from the array and counter substrate, and a reflection plate which is formed on the array substrate and scatters light entering through the counter substrate and the liquid crystal layer. Particularly, the plurality of pixel regions are formed in an approximately matrix manner, and the reflection plate includes types of projection-recess patterns each separated from another of the same type in at least one of the row and column directions of the pixel regions.

13 Claims, 12 Drawing Sheets

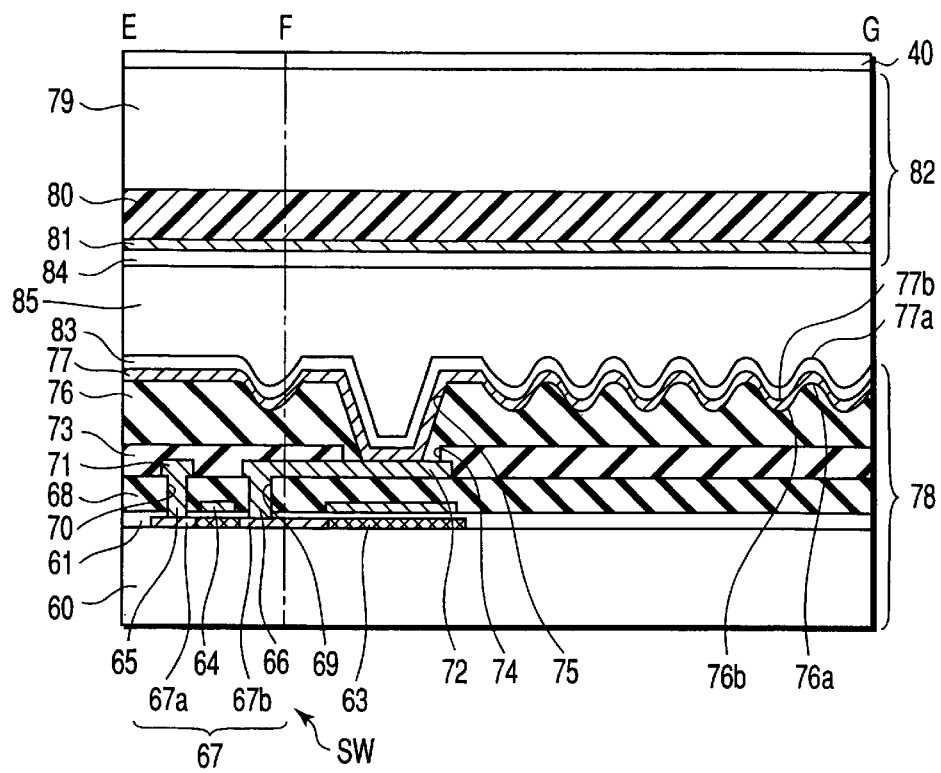
F I G. 2
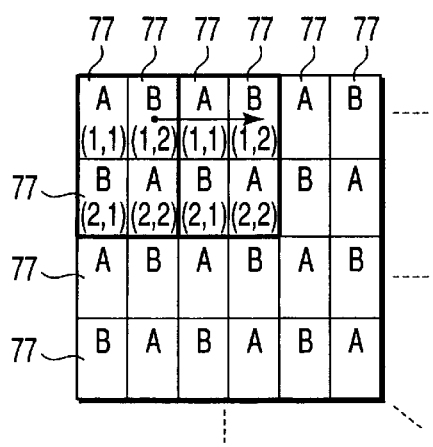
F I G. 3

LIQUID CRYSTAL DISPLAY DEVICE WITH PROJECTION-RECESS PATTERNS FORMED IN PIXEL REGIONS FOR REFLECTING INCIDENT LIGHT

CROSS-REFERENCE TO RELATED APPLICATIONS

This application is based upon and claims the benefit of priority from the prior Japanese Patent Applications No. 2000-395931, filed Dec. 26, 2000; and No. 2001-376016, filed Dec. 10, 2001, the entire contents of both of which are incorporated herein by reference.

BACKGROUND

1. Field of the Invention

The present invention relates to a liquid crystal display device for displaying an image using an external light source such as external light entering from an ambient area, or using an internal light source such as a back light in addition to the external light source.

2. Description of the Related Art

Recently, liquid crystal display devices have been used in various types of equipment such as personal computers, RVs, word processors, portable phones, and the like. While the fields in which liquid crystal display devices are applied increase, it is increasingly desired to have a high-performance feature of a compact size, lower power consumption, low manufacturing cost, and the like. In particular, there is a growing demand for the development of a semi-transmission type liquid crystal display device that has both the characteristics of a reflection type liquid crystal display device that has both the characteristics of a reflection type liquid crystal display and those of a transmission type liquid crystal display device as a display device to be applied to portable phones and the like that are used outdoors as well as indoors.

The semi-transmission type liquid crystal display device not only can display an image in the environment of a room, where little external light enters from an ambient area, by optically modulating transmitted light from a backlight through a liquid crystal layer as in a transmission type liquid crystal display device, but also can display an image outside, where a lot of external light enters from the periphery, by reflecting external light by a reflection plate and optically modulating it through the liquid crystal layer as in a reflection type liquid crystal display device. When external light is reflected by a reflection plate in a reflection type or semi-transmission type liquid crystal display device, it is important not to attenuate the intensity of light as far as possible, to display a bright image. In particular, there has been made an attempt to optimally arrange a reflection plate to provide reflection characteristics capable of effectively reflecting external light entering at any angle, as the reflection characteristics thereof greatly affect the attenuation of the intensity of light.

FIG. 17 shows a projection-recess pattern formed in each of pixel electrodes used as a reflection plate in a conventional reflection type liquid crystal display device. The projection-recess pattern includes a plurality of semi-spherical projections irregularly disposed, for example, on the surface of the electrode and a recess surrounding the projections. With this arrangement, the scatter of reflected light is controlled so that the reflected light concentrates in the region of a given range and that the intensity of the reflected light is increased in a particular observing direction.

However, when a single type of projection-recess patterns are formed side by side in the pixel electrodes as shown in FIG. 17, an image of high quality cannot be displayed. That is, the interference of light, which is scattered by the projection-recess patterns of the pixel electrodes, is made regular as a whole. Thus, the interference of light makes it difficult to observe an image. Further, the refraction factor of the liquid crystal material of a liquid crystal layer has a wavelength dependency. Thus, even if white external light is incident on the projection-recess patterns of the pixel electrodes from one direction through the liquid crystal layer, the external light is scattered in different directions with a deviation depending on each wavelength. Accordingly, the color of an image varies with the visual angle of an observer to a display surface. In particular, in a color liquid crystal display device, color oozing is caused thereby and greatly deteriorates the quality of a displayed image.

SUMMARY

The inventions provide, in part, a liquid crystal display device capable of obtaining a displayed image of higher quality using external ambient light.

According to the inventions, there is provided a liquid crystal display device comprising:

first and second electrode substrates; a liquid crystal layer held between the first and second electrode substrates and partitioned into a plurality of pixel regions in each of which the alignment of liquid crystal molecules is controlled from the first and second electrode plates; and a reflection plate formed on the first electrode substrate for scattering light entering through the second electrode plate and the liquid crystal layer, wherein the plurality of pixel regions are formed in an approximately matrix manner, and the reflection plate includes types of projection-recess patterns each separated from another of the same type in at least one of the row and column directions of the pixel regions.

In the liquid crystal display device, the reflection plate includes types of projection-recess patterns each separated from another of the same type. That is, since adjacent projection-recess patterns are different from each other in at least one of the row direction and the column direction of the pixel regions, the interference of light that is scattered by these projection-recess patterns can be made irregular as a whole. Therefore, difficulty in the observation of an image due to the interference of light can be reduced without impairing an excellent contrast in the reflection display mode.

Various objects and advantages of the invention will be set forth in the description which follows, and in part will be apparent from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 2 is a view showing a sectional structure of a pixel region taken along the line II—II shown in FIG. 1;

FIG. 3 is a view showing the combination and layout of projection-recess patterns provided for pixel electrodes shown in FIG. 1;

FIG. 4 is a view showing a first modification of the combination and layout of the projection-recess patterns shown in FIG. 3;

FIG. 5 is a view showing a second modification of the combination and layout of the projection-recess patterns shown in FIG. 3;

DETAILED DESCRIPTION

A reflection type liquid crystal display device according to a first embodiment of the present invention will be described below with reference to the accompanying drawings.

Figure 1:
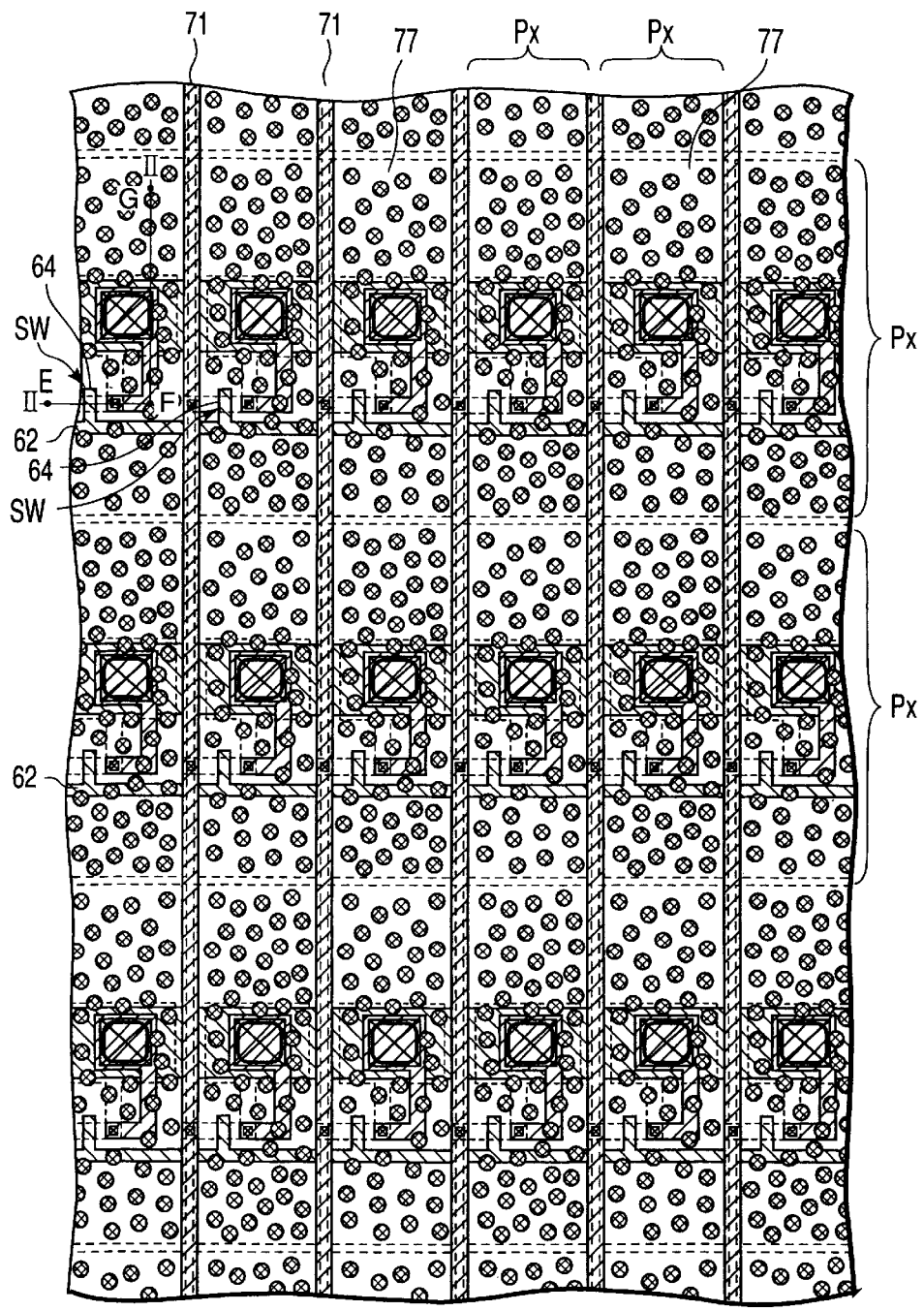
FIG. 1 is a view showing a partial plane structure of a reflection type liquid crystal display device according to a first embodiment of the present invention.

FIG. 1 shows a partial plane structure of the reflection type liquid crystal display device. FIG. 2 shows a sectional structure of a pixel region shown in FIG. 1. As shown in FIG. 2, the liquid crystal display device comprises an array substrate 78, a counter substrate 82, and a liquid crystal layer 85 held therebetween.

The array substrate 78 includes an insulation substrate 60, a plurality of pixel electrodes 77 arranged in a matrix manner, a plurality of signal lines 71 disposed along the columns of the pixel electrodes 77, a plurality of scanning lines 62 disposed along the rows of the pixel electrodes 77, a plurality of thin film transistors (TFT) SW each disposed near intersections of a corresponding scanning line 62 and a corresponding signal line 71 and serving as a pixel switching element, a drive circuit for driving the scanning lines 62 and the signal lines 71, and an alignment film 83 covering the pixel electrodes 77. The counter substrate 82 includes a light transmitting insulation substrate 79, a coloring layer 80 formed on the insulation substrate 79, a transparent counter electrode 81 covering the coloring layer 80, and an alignment film 84 covering the counter electrodes 81. The coloring layer 80 includes red, green, and blue striped color filters arranged in the row direction and each facing the pixel electrodes 77 of a corresponding column. Further, a polarizing plate 40 is affixed to the insulation substrate 79 on a side opposite to the coloring layer 80. In this reflection type liquid crystal display device, the liquid crystal layer 85 is partitioned into a plurality of pixel regions PX according to the pixel electrodes 77, each pixel region PX is located substantially between two adjacent scanning lines 62 and two adjacent signal lines 71. Each thin film transistor SW turns on in response to a scanning pulse supplied from a corresponding scanning line 62 to supply the potential of a corresponding signal line 71 to a corresponding pixel electrode 77. Each pixel electrode 77 applies the potential of a corresponding signal line 71 to a corresponding pixel region PX of the liquid crystal layer 85 as a pixel potential, thereby causing the transmittance of the pixel region PX to be controlled based on the difference between the pixel potential and the potential of the counter electrode 81. The drive circuit for the scanning lines 62 and the signal lines 71 includes a plurality of thin film transistors, which are formed in the same manner as the pixel switching elements, and the wirings thereof. These thin film transistors are of P- and N-channel types.

In the array substrate 78, each thin film transistor SW includes a semiconductor layer 67, a gate electrode 64 which is formed above the semiconductor layer 67, insulated from the same, and connected to a corresponding scanning line 62, and source and drain electrodes 66 and 65 which are formed in contact with the semiconductor layer 67 through contact holes 69 and 70 on both sides of the gate electrode 64 and connected to a corresponding pixel electrode 77 and a corresponding signal line 71, respectively. The semiconductor layer 67 is formed on the insulation substrate 60 and covered with a gate insulation film 61 together with the insulation substrate 60. The gate electrode 64 is insulated from the semiconductor layer 67 by the gate insulation film 61 and formed integrally with a corresponding scanning line 62 on the gate insulation film 61. Further, a plurality of storage capacitance lines 63 are formed on the gate insulation film 61 and capacitively coupled to the rows of the pixel electrodes 77, respectively. The gate electrodes 64, the scanning lines 62, and the storage capacitance lines 63 are covered with an interlayer insulation film 68 together with the gate insulation film 61. The contact holes 69 and 70 are formed in the interlayer insulation film 68 and the gate insulation film 61 to expose a source 67b and drain 67a formed in the semiconductor layer 67 on both sides of the gate electrode 64. The source and drain electrode 66 and 65 are formed on the interlayer insulation film 68 in contact with the source 67b and drain 67a of the semiconductor layer 67 exposed by the contact holes 69 and 70. The source electrode 66 is formed integrally with an extended source electrode 72 on the interlayer insulation film 68, the drain electrode 65 is formed integrally with the corresponding signal line 71 on the interlayer insulation film 68. The source electrode 66, the extended source electrode 72, the drain electrode 65, and the corresponding signal line 71 are covered with a protective insulation film 73 together with the interlayer insulation film 68. The protective insulation film 73 includes a contact hole 74 partially exposing the extended source electrode 72, and is covered with an organic insulation film 76. The organic insulation film 76 includes a contact hole 75 partially exposing the extended source electrode 72 within the contact hole 74 of the protective insulation film 73. The pixel electrode 77 is formed on the organic insulation film 76 in contact with that part of the extended source electrode 72 which corresponds to the contact holes 74 and 75, and covered with the alignment film 83.

The plurality of pixel electrodes 77 also serve as a reflection plate for scattering light, which enters from the counter substrate 82 side through the liquid crystal layer 85, at a high reflectance, and are metal layers formed using the upper surface of the organic insulation film 76 as an underlayer. The organic insulation film 76 includes a plurality of projection-recess patterns. Each of the projection-recess patterns having a plurality of semi-spherical projections 77a disposed at random in the range of one pixel region PX and a recess 77b disposed so as to surround these projections 77a. The plurality of pixel electrodes 77 contain a metal material such as, for example, silver, aluminum, or the alloys thereof, and are formed in a predetermined thickness along the projection-recess patterns of the organic insulation film 76. Accordingly, each pixel electrode 77 includes a projection-recess pattern having semi-spherical projections 77a which are defined by the semi-spherical projections 77a of the organic insulation film 76 so as to be disposed at random in the range of a corresponding pixel region PX, and a recess 77b which is defined by the recess 77b of the organic insulation film 76 so as to surround the projections 77a. There are two types of the projection-recess patterns for the pixel electrodes 77 as shown by A and B in FIG. 3. Each projection-recess pattern is separated from another of the same type in the row and column directions of the pixel electrodes 77. In the projection-recess pattern of each pixel electrode, the plurality of projections 77a constitute main scattering portions to incident light, and the recess 77b constitutes a sub-scattering portion to the incident light.

Next, a manufacturing process of the aforementioned reflection type liquid crystal display device will be described.

In the manufacture of the array substrate 78, a high strain-point glass plate or quartz plate is used as the insulation substrate 60. The semiconductor layers 67 are formed in such a manner that amorphous silicon is deposited on the insulation substrate 60 in a thickness of about 50 nm by CVD, annealed in a furnace at 450° C. for one hour, and crystallized as a poly-crystal silicon film by irradiation of an XeCl excimer laser, and then the poly-crystal silicon film is patterned by photo etching. The gate insulation film 61 is formed by depositing $SiO_x$ on the semiconductor layers 67 and the insulation substrate 60 in a thickness of about 100 nm by CVD. Subsequently, the gate electrodes 64, the scanning lines 62, the storage capacitance lines 63 and the gate electrodes and other wirings of the thin film transistors for the drive circuit are formed by depositing a single, multi-layered or alloy film of one or more materials selected from Ta, Cr, Al, Mo, W, Cu and the like, on the gate insulation film 61 in a thickness of about 400 nm and patterning it in a predetermined shape by photo etching.

Thereafter, an impurity such as phosphorus is doped into the semiconductor layer 67 by ion implantation or ion doping method with the gate electrodes 64 used as a mask. Here, phosphorus ions are accelerated in, for example, an atmosphere of $PH_3/H_2$ at an acceleration voltage of 80 keV and implanted at a high concentration of a dose of $5 \times 10^{15}$ atoms/cm$^2$. Thereafter, the drain electrodes 65 and the source electrodes 66 of the thin film transistors SW for the pixels and the source and drain electrodes of the N-channel thin film transistors for the drive circuit are formed.

Subsequently, the thin film transistors SW for the pixels and the N-channel thin film transistors for the drive circuit are covered with a resist so that impurities are not implanted thereto, and an impurity such as boron is doped with the gate electrodes of the P-channel thin film transistors for the drive circuit used as mask. Here, boron ions are accelerated in, for example, an atmosphere of $B_2H_6/H_2$ at an acceleration voltage of 80 keV and implanted at a high concentration of a dose of $5 \times 10^{15}$ atoms/cm$^2$. Then, the source electrodes and the drain electrodes of the P-channel thin film transistors are formed. Ion implantation of an impurity is carried out so as to obtain an LDD (lightly doped drain) structure in the N-channel thin film transistors SW. Thereafter, the ion-implanted regions are activated by annealing to form the sources 67b and the drains 67a.

The interlayer insulation film 68 is formed by depositing $SiO_2$ on the gate electrodes 64, the scanning lines 62, the storage capacitance lines 63, the other wirings for the drive circuit, and the gate insulation film 61 in a thickness of about 500 nm by, for example, PECVD. The interlayer insulation film 68 is patterned by photo etching so as to expose the sources 67b and the drains 67a of the semiconductor layer 67, thereby forming the contact holes 69 and 70.

A single, multi-layered or alloy film of one or more materials selected from Ta, Cr, Al, Mo, W, Cu and the like is deposited on the interlayer insulation film 68 in a thickness of about 500 nm and patterned in a predetermined shape by photo etching, thereby forming the signal lines 71, the source electrodes 66, the extended source electrodes 72, and the wirings for the drive circuit.

The protective insulation film 73 is formed by depositing $SiN_x$ on the wirings and the interlayer insulation film 68 by PECVD. The contact holes 74 are formed by patterning the protective insulation film 73 by photo etching.

A photosensitive resin, for example, is coated as the organic insulation film 76 on the protective insulation film 73 in a thickness of about 2 $\mu$m and partially exposed to light in a range corresponding to the contact holes 74 using a photomask for the contact holes 75. Further, the photosensitive resin is exposed as to light using a photomask for the projection-recess patterns. This photomask has a plurality of circular light-shielding portions disposed in the range of each pixel region PX at random so as not to overlap the signal lines 71. Here, the amount of exposure for the projection-recess patterns is set to about 10% to 50% of the amount of exposure for the contact holes formed in the organic insulation film 76. The photomask for the projection-recess patterns has a size of 2×2 pixels shown by thick lines in FIG. 3 and defines the projection-recess pattern A at pattern positions (1, 1) and (2, 2) and the projection-recess pattern B at pattern positions (2, 1) and (1, 2). Exposure is performed while shifting the photomask at a pitch of two pixels in the row direction of the pixel electrodes 77 shown by an arrow in FIG. 3, for example. In this case, each time the photomask reaches a final pixel electrode 77 of each row, it is further shifted in the column direction of the pixel electrodes 77 by two pixels. Inversely, the exposure may be performed while shifting the photomask at a pitch of two pixels in the column direction of the pixel electrodes 77. In this case, each time the photomask reaches a final pixel electrode 77 of each column, it is further shifted in the row direction of the pixel electrodes 77 by two pixels.

The organic insulation film 76 is subjected to development to remove the aforementioned exposed portions, thereby forming the plurality of projections 77a and the recess 77b on the organic insulation film 76 together with the contact holes 75. At this time, the projections 77a and the recess 77b are in an acute angle state. Thus, the array substrate 78 is subjected to heat treatment at, for example, 200° C. for about 60 minutes, thereby causing the surfaces of the projections 77a and the recess 77b to be rounded and smoothed.

A metal film of, for example, Al, Ni, Cr, Ag or the like is deposited on the organic insulation film 76 in a thickness of about 200 nm by sputtering and patterned in a predetermined shape by photo etching to obtain the pixel electrodes 77 formed in contact with the extended source electrodes 72 and capacitively coupled with the storage capacitance lines 63.

Subsequently, a plurality of columnar spacers are formed in predetermined regions to secure a predetermined gap defining the thickness of the liquid crystal layer 85. Then, the alignment film 83 is formed by a rubbing process of low temperature curing type polyimide which is coated by printing in a thickness of about 3 $\mu$m so as to cover the pixel electrodes 77 and the organic insulation film 76.

In the manufacture of the counter substrate 82, a high strain-point glass plate or quartz plate is used as the light transmitting insulation substrate 79, and the coloring layer 80, in which pigments are dispersed, is formed on the insulation substrate 79. The transparent counter electrode 81 is formed by depositing, for example, ITO on the coloring layer 80 by sputtering. Subsequently, the alignment film 84 is formed by a rubbing process of low temperature curing type polyimide coated by printing in a thickness of about 3 $\mu$m so as to cover the counter electrodes 81. Note that the alignment films 83 and 84 are rubbed in directions causing the alignment axes thereof to be offset by, for example, 70° to each other.

The array substrate 78 is integrated with the counter substrate 82 after the alignment films 83 and 84 are formed. Specifically, the array substrate 78 and the counter substrate 82 are opposed with the alignment films 83 and 84 disposed inside thereof and bonded to each other by a peripheral sealing member. The liquid crystal layer 85 is obtained by pouring a liquid crystal composition such as nematic liquid crystal poured into a liquid crystal pouring space serving as a cell surrounded and sealed by the peripheral sealing member between the array substrate 78 and the counter substrate 82. The polarizing plate 40 is affixed to the insulation substrate 79 on the side opposite to the coloring layer 80 in the state where the liquid crystal layer 85 is held between the array substrate 78 and the counter substrate 82. The reflection type liquid crystal display device is completed as described above.

According to the liquid crystal display device of the first embodiment, the reflection plate is composed of the plurality of pixel electrodes 77. Each pixel electrode 77 has one of the projection-recess patterns A and B. The projection-recess patterns A and B are formed in the pixel electrodes 77 in such a combination that each projection-recess pattern is not located next to another of the same type. That is, different types of projection-recess patterns are arranged side by side in each of the row and column directions of pixel regions PX, the interference of light that is scattered by projection-recess patterns A and B of the pixel electrodes 77 can be made irregular as a whole. As a result, difficulty in the observation of an image due to the interference of light can be reduced without impairing an excellent contrast.

Figures 4, 5:
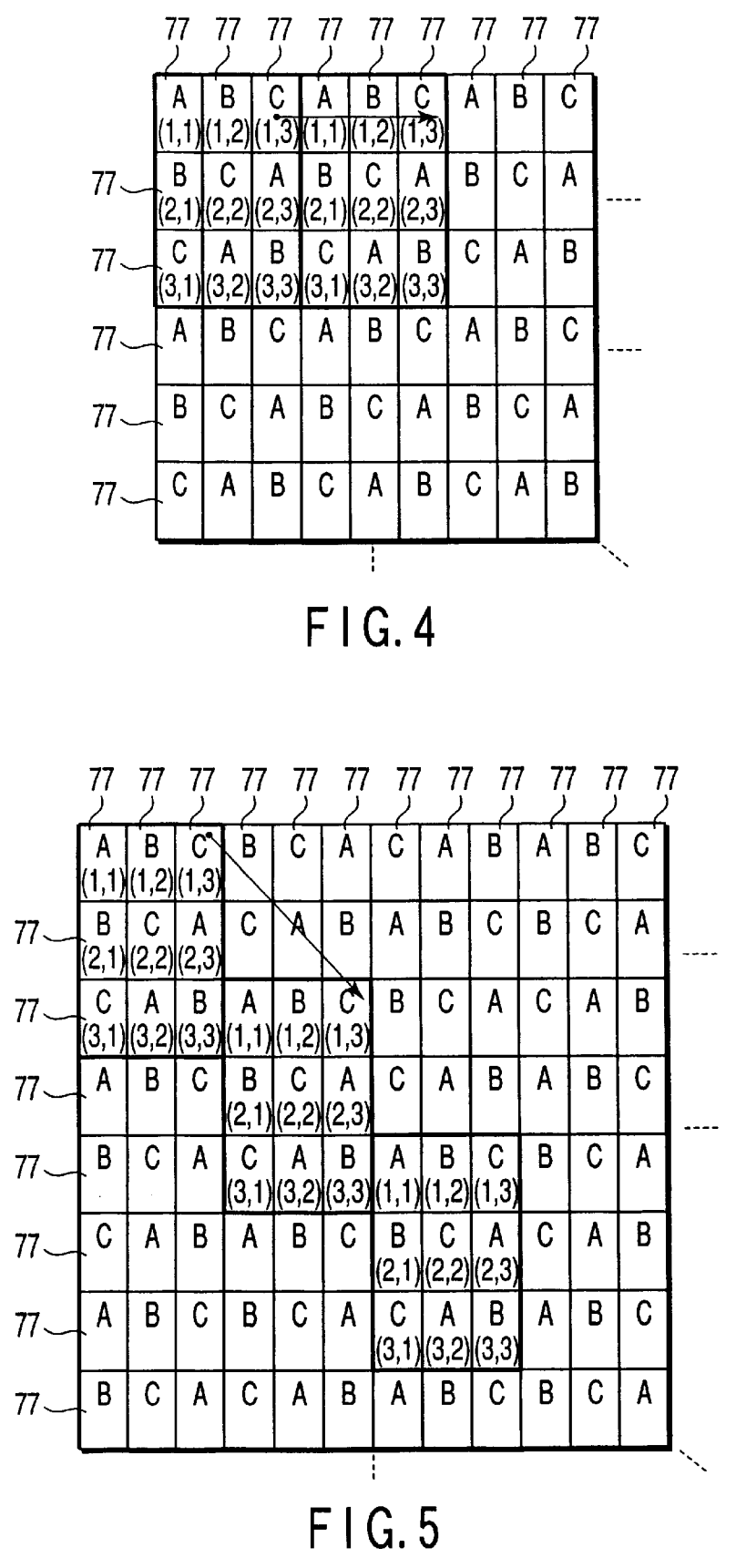

FIG. 4 shows a first modification of the layout of the patterns shown in FIG. 3. In the first modification, a projection-recess pattern photomask has a size of 3×3 pixels as shown by thick lines in FIG. 4, and defines a projection-recess pattern A at pattern positions (1, 1), (2, 3), and (3, 2), a projection-recess pattern B at pattern positions (1, 2), (2, 1), and (3, 3), and a projection-recess patterns C at pattern positions (1, 3), (2, 2), and (3, 1). As shown by, for example, an arrow of FIG. 4. Exposure is performed while shifting the photomask at a pitch of three pixels in the row direction of the pixel electrodes 77 shown by an arrow in FIG. 4, for example. In this case, each time the photomask reaches a final pixel electrode 77 of each row, it is further shifted in the column direction of the pixel electrodes 77 by three pixels.

According to the first modification, the projection-recess patterns A, B, and C are formed in the plurality of pixel electrodes 77 in such a combination that each projection-recess pattern is not located next to another of the same type. In particular, according to the layout of the projection-recess patterns of the first modification, the interference of light, that is scattered by the projection-recess patterns A, B and C of the pixel electrodes 77, can be made more irregular as a whole as compared with the interference of light scattered by the projection-recess patterns arranged as shown in FIG. 3. As a result, difficulty in the observation of an image due to the interference of light can be more reduced without impairing an excellent contrast.

FIG. 5 shows a second modification of the layout of the patterns shown in FIG. 3. In the second modification, a projection-recess pattern photomask has a size of 3×3 pixels as shown by thick lines in FIG. 5, and defines a projection-recess pattern A at pattern positions (1, 1), (2, 3), and (3, 2), a projection-recess pattern B at pattern positions (1, 2), (2, 1), and (3, 3), and a projection-recess pattern C at pattern positions (1, 3), (2, 2), and (3, 1). As shown by, for example, an arrow of FIG. 5, exposure is performed while shifting the photomask at a pitch of three pixels in the row direction of the pixel electrodes 77 and at a pitch of two pixels in the column direction thereof.

According to the second modification, the projection-recess patterns A, B, and C are formed in the plurality of pixel electrodes 77 in such a combination that each projection-recess pattern is not located next to another of the same type. In particular, according to the layout of the projection-recess patterns of the second modification, the interference of light, that is scattered by the projection-recess patterns A, B and C of the pixel electrodes 77, can be made more irregular as a whole as compared with the interference of light scattered by the projection-recess patterns arranged as shown in FIG. 4. As a result, difficulty in the observation of an image due to the interference of light can be more reduced without impairing an excellent contrast.

Figure 6:
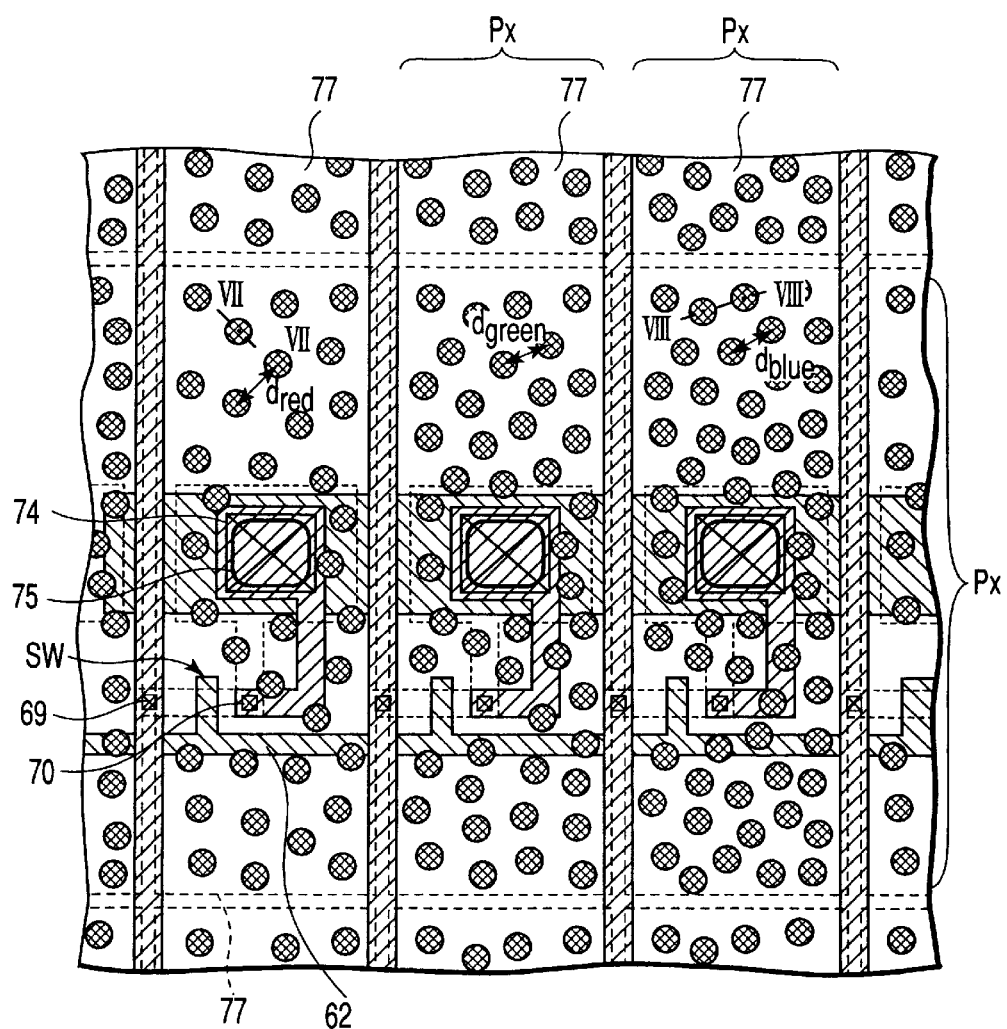
FIG. 6 is a view showing a partial plane structure of a reflection type liquid crystal display device according to a second embodiment of the present invention.

Next, a reflection type liquid crystal display device according to a second embodiment of the present invention will be described below with reference to the accompanying drawings. FIG. 6 shows a partial plane structure of the reflection type liquid crystal display device. The liquid crystal display device is arranged similarly to that of the first embodiment except for the following arrangement. Thus, the same reference numerals as used in the first embodiment are used in FIG. 6 to denote the same portions, and the description thereof is omitted.

In this reflection type liquid crystal display device, types of projection-recess patterns are formed in the pixel electrodes 77 of pixel regions PX for different display colors, respectively. The average pitch of the main scattering portions of each projection-recess pattern depends on the wavelength λ of the display color assigned to a corresponding pixel region PX. Specifically, the average pitch of the projections 77a disposed in each pixel electrode 77 at random is determined according to the wavelength λ of a corresponding filter color of the coloring layer 80.

The pixel electrodes 77 of an n-th column, the pixel electrodes 77 of an (n+1)-th column, and the pixel electrodes 77 of an (n+2)-th column face red, green, and blue color filters, respectively (n=1, 2, 3 . . .). These pixel electrodes 77 include, for example, projection-recess patterns R in each of which a plurality of projections 77a serving as red pixel is main scattering portions are disposed at random at an average pitch of $d_{red}$, projection-recess patterns G in each of which a plurality of projections 77a serving as green pixel main scattering portions are disposed at random at an average pitch of $d_{green}$, and projection-recess patterns B in each of which a plurality of projections 77a serving as blue pixel main scattering portions are disposed at random at an average pitch of $d_{blue}$. Further, in each of the projection-recess patterns R, G, and B, a recess 77b serving as a sub-scattering portion is disposed so as to surround the projections 77a similarly to the first embodiment.

These average pitches $d_{red}$, $d_{green}$, and $d_{blue}$ are set such that they are shorter as the wavelengths λ of the colors of the color filters are shorter and set longer as they are longer. Thus, the relationship of $d_{red} > d_{green} > d_{blue}$ is established therebetween. Specifically, the average pitches are set such that white light, beams which enter from one direction, are reflected in different directions according to the respective wavelengths λ in the red, green and blue pixel regions, so that they can exit in the same direction in order to attain excellent color display of white.

Figure 17:
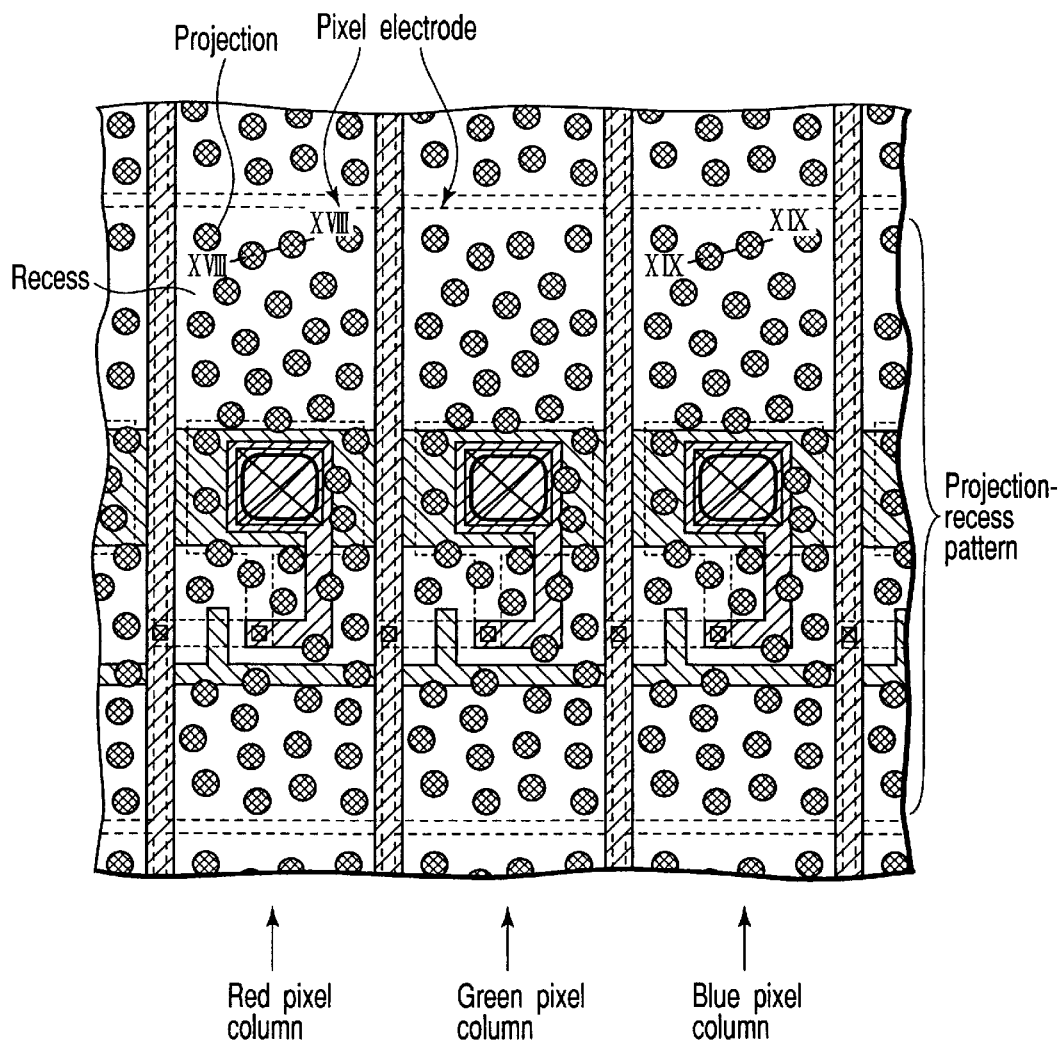
FIG. 17 is a view showing a partial plane structure of a conventional reflection type liquid crystal display device.
Figure 18:
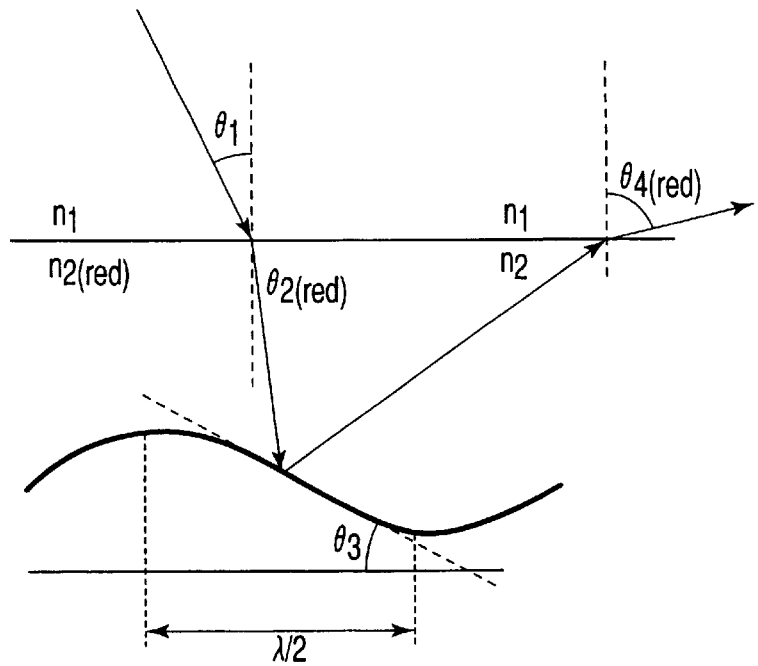
FIG. 18 is a view showing a locus of a light beam in the cross section of a red pixel region taken along the line XVIII—XVIII shown in FIG. 17.
Figure 19:
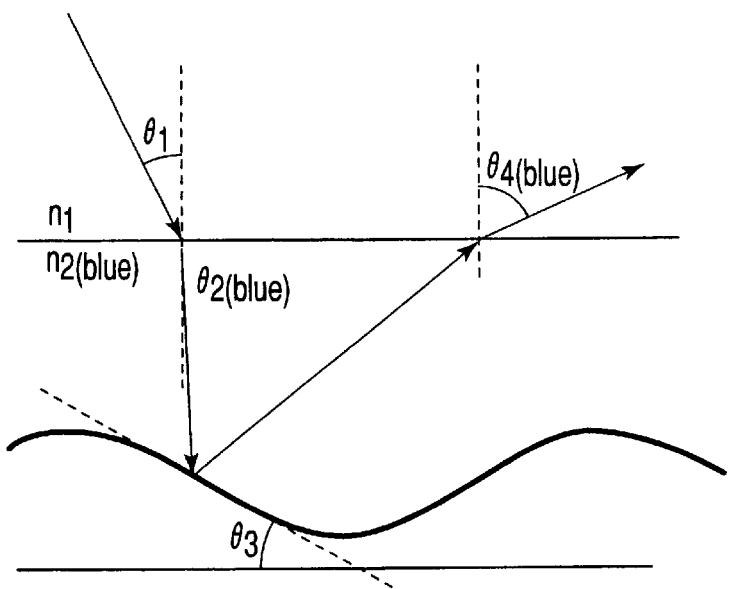
FIG. 19 is a view showing a locus of a light beam in the cross section of a blue pixel region taken along the line XIX—XIX shown in FIG. 17.

Next, the locus of a light beam in a conventional reflection type liquid crystal display device in which a single type of projection-recess pattern is formed in all the pixel electrodes as shown in FIG. 17 will be compared with the locus of a light beam in the reflection type liquid crystal display device of the second embodiment as shown in FIG. 6. FIG. 18 shows the locus of a light beam in the cross section of a red pixel region taken along the line XVIII—XVIII shown in FIG. 17, and FIG. 19 shows the locus of a light beam in the cross section of a blue pixel region taken along the line XIX—XIX shown in FIG. 17. In FIGS. 18 and 19, $n_1$ shows a refractive index in air, $n_2$ shows a refractive index of a liquid crystal material, $\theta_1$ shows an incident angle of incident light traveling from the outside to the liquid crystal layer, $\theta_2$ shows an exit angle of the incident light refracted by the liquid crystal layer and traveling to the pixel electrode, $\theta_3$ shows an inclination of the pixel electrode with respect to a horizontal plane, and $\theta_4$ shows an exit angle of the reflected light reflected by the pixel electrode and traveling to the outside of the liquid crystal layer, respectively. The exit angle $\theta_4$ has the following relationship with respect to the incident angle $\theta_1$, the inclination $\theta_3$, the refractive index $n_1$, and the refractive index $n_2$.

$$\sin\theta_4 = \sin\theta_1 \cos2\theta_3 + \sin2\theta_3 \sqrt{\left(\frac{n_2}{n_1}\right)^2 - \sin^2\theta_1}$$

The refractive index $n_2$ of the liquid crystal material is usually larger when a wavelength is shorter. Thus, the above formula shows that when the wavelength λ is shorter, the exit angle $\theta_4$ is larger with respect to the incident light from the $\theta_1$ direction. That is, when the exit angle of the red component light is shown by $\theta_{4\ (red)}$ and the exit angle of blue component light is shown by $\theta_{4\ (blue)}$, there is established a relationship $\theta_{4\ (red)} > \theta_{4\ (blue)}$. Accordingly, when a single type of projection-recess pattern is formed in all the pixel electrodes regardless of display color, as in the conventional reflection type liquid crystal display device shown in FIG. 17, excellent color display of white cannot be achieved since the color components of reflected light are separately observed from a viewpoint on a line oblique to the liquid crystal layer.

Figure 7:
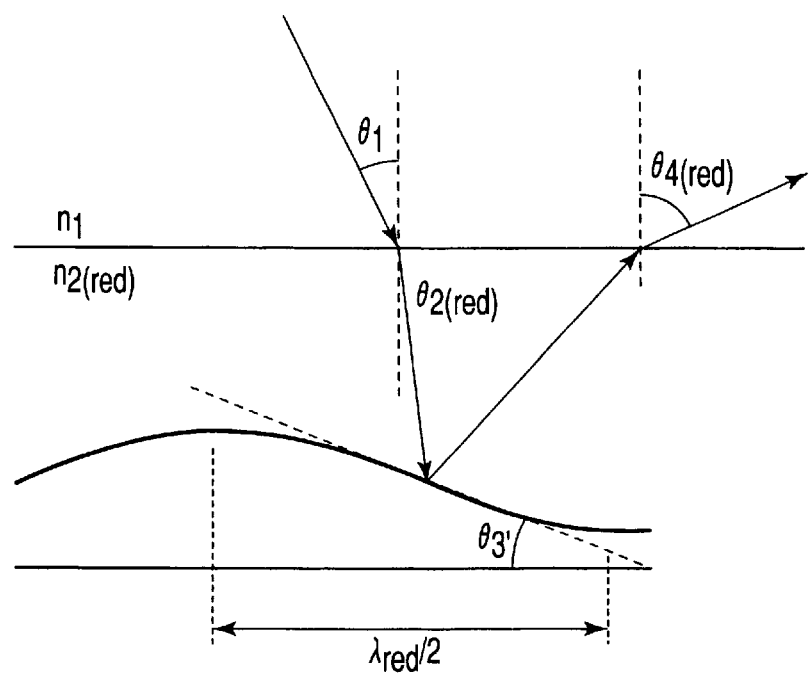
FIG. 7 is a view showing a locus of a light beam in the cross section of a red pixel region taken along the line VII—VII shown in FIG. 6.
Figure 8:
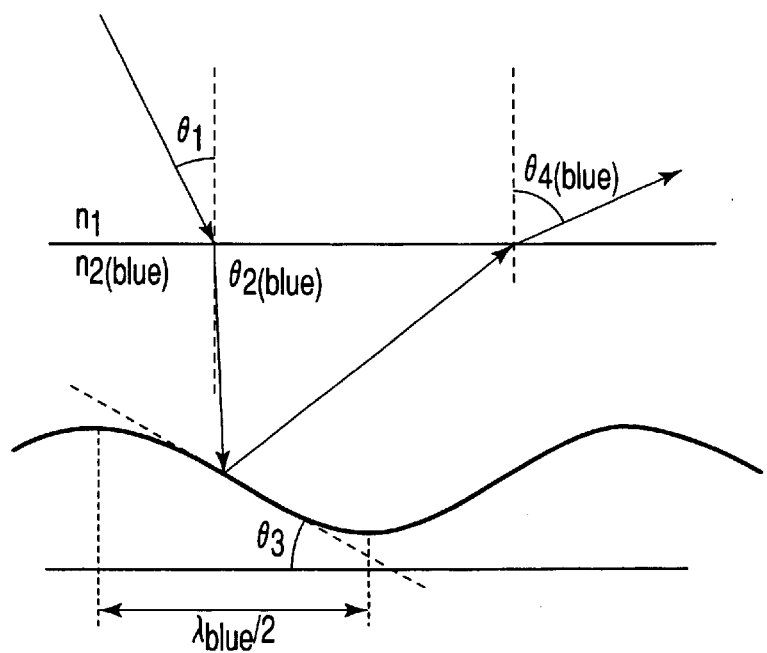
FIG. 8 is a view showing a locus of a light beam in the cross section of a blue pixel region taken along the line VIII—VIII shown in FIG. 6.

In contrast, in the reflection type liquid crystal display device of the second embodiment shown in FIG. 6, the projection-recess patterns R, G, and B are formed in the pixel electrodes 77 of the red, green, and blue pixel regions PX, respectively. Further, the average pitches of the main scattering portions of the projection-recess patterns R, G, and B depend on the wavelengths λ of red, green, and blue which are the display colors of the respective pixel regions PX. FIG. 7 shows the locus of a light beam in the cross section of a red pixel region taken along the line VII—VII shown in FIG. 6. FIG. 8 shows the locus of a light beam in the cross section of a blue pixel region taken along the line VIII—VIII shown in FIG. 6. In FIGS. 7 and 8, $n_1$ shows a refractive index in air, $n_2$ shows a refractive index of a liquid crystal material, $\theta_1$ shows an incident angle of incident light traveling from the outside to the liquid crystal layer, $\theta_2$ shows an exit angle of the incident light refracted by the liquid crystal layer and traveling to the pixel electrode, $\theta_3$ shows an inclination of the pixel electrode with respect to a horizontal plane, and $\theta_4$ shows an exit angle of the reflected light reflected by the pixel electrode and traveling to the outside of the liquid crystal layer, respectively. The pitch of the projections 77a in FIG. 7 is longer than that in FIG. 8. The difference of height between the projections 77a and the recess 77b is not varied with the pitch. However, a longer pitch can make the maximum value of the inclination $\theta_3$ of the pixel electrode 77 smaller with respect to the horizontal plane. That is, when the pitch, which prescribes the inclination $\theta_3$ of the pixel electrodes 77, is set longer to obtain the inclination $\theta_3'$ of the pixel electrode 77, the inclinations $\theta_3$ and $\theta_3'$ have a relationship $\theta_3' < \theta_3$. Thus, the exit angles can be set to a substantially constant value that does not depend on the display color, by selecting a pitch for each display color from the relationship of the above formula so as to establish a relationship of exit angle $\theta_4$ (red) of the red component light=exit angle $\theta_{4\ (blue)}$ of the blue component light. With this structure, excellent color display of white can be achieved without causing the color components of reflected light to be separately observed from a viewpoint on a line oblique to the liquid crystal layer 85.

Figure 9:
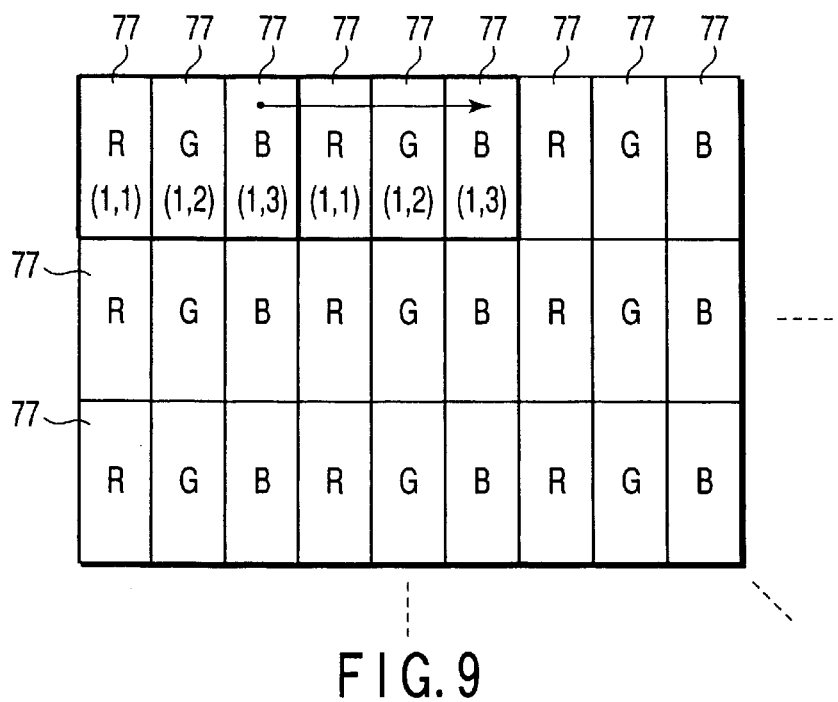
FIG. 9 is a view showing the combination and layout of projection-recess patterns provided for pixel electrodes shown in FIG. 6.

A projection-recess pattern photomask has a size of 1×3 pixels as shown by thick lines in FIG. 9, and defines a projection-recess pattern R at a pattern position (1, 1), a projection-recess pattern G at a pattern position (1, 2), and a projection-recess pattern B at a pattern position (1, 3). As shown by, for example, an arrow of FIG. 9, exposure is performed while shifting the photomask at a pitch of three pixels in the row direction of the pixel electrodes 77. In this case, each time the photomask reaches a final pixel electrode 77 of each row, it is further shifted in the column direction of the pixel electrodes 77 by one pixel.

According to the liquid crystal display device of the embodiment, the projection-recess patterns R, G, and B are formed in the plurality of pixel electrodes 77 in such a combination that each projection-recess pattern are not located next to another of the same type. With this arrangement, the interference of light that is scattered by the projection-recess patterns R, G, and B of the pixel electrodes 77 can be made irregular as a whole. Therefore, difficulty in the observation of an image due to the interference of light can be more reduced without impairing an excellent contrast. Further, the average pitches of the main scattering portions of the projection-recess patterns R, G, and B, that is, the average pitches of the projections 77a are determined according to the wavelengths λ of red, green, and blue color filters, respectively such that the exit angles $\theta_4$ coincide with each other. Thus, excellent color display of white can be achieved without causing the color components of reflected light to be separately observed from a viewpoint on a line oblique to the liquid crystal layer 85.

Figure 10:
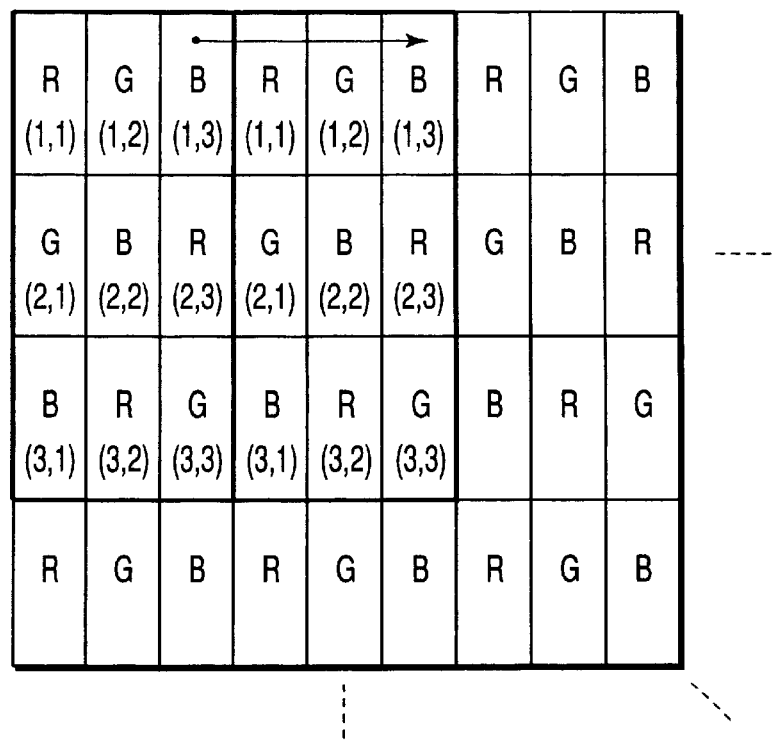
FIG. 10 is a view showing a modification of the combination and layout of the projection-recess patterns shown in FIG. 9.

FIG. 10 shows a modification of the combination and the layout of the projection-recess patterns shown in FIG. 9. This modification is applied to a case in which the red, green, and blue color filters are arranged in a matrix manner in place of a striped manner. In this case, a projection-recess pattern photomask has a size of 3×3 pixels as shown by thick lines in FIG. 10, and defines a projection-recess pattern R at pattern positions (1, 1), (2, 3), and (3, 2) that correspond to red pixel regions PX, a projection-recess pattern G at pattern positions (1, 2), (2, 1), and (3, 3) that correspond to green pixel regions PX, and a projection-recess pattern B at pattern positions (1, 3), (2, 2), and (3, 1) that correspond to blue pixel regions PX. As shown by, for example, an arrow in FIG. 10, exposure is performed while shifting the photomask at a pitch of three pixels in the row direction of the pixel electrodes 77. In this case, each time the photomask reaches a final pixel electrode 77 of each row, it is further shifted in the column direction of the pixel electrodes 77 by three pixels.

According to this modification, even if the display colors of the pixel regions PX are different in each column, an effect similar to that of the second embodiment can be obtained.

A semi-transmission type liquid crystal display device according to a third embodiment of the present invention will be described below with reference to the accompanying drawings.

Figure 11:
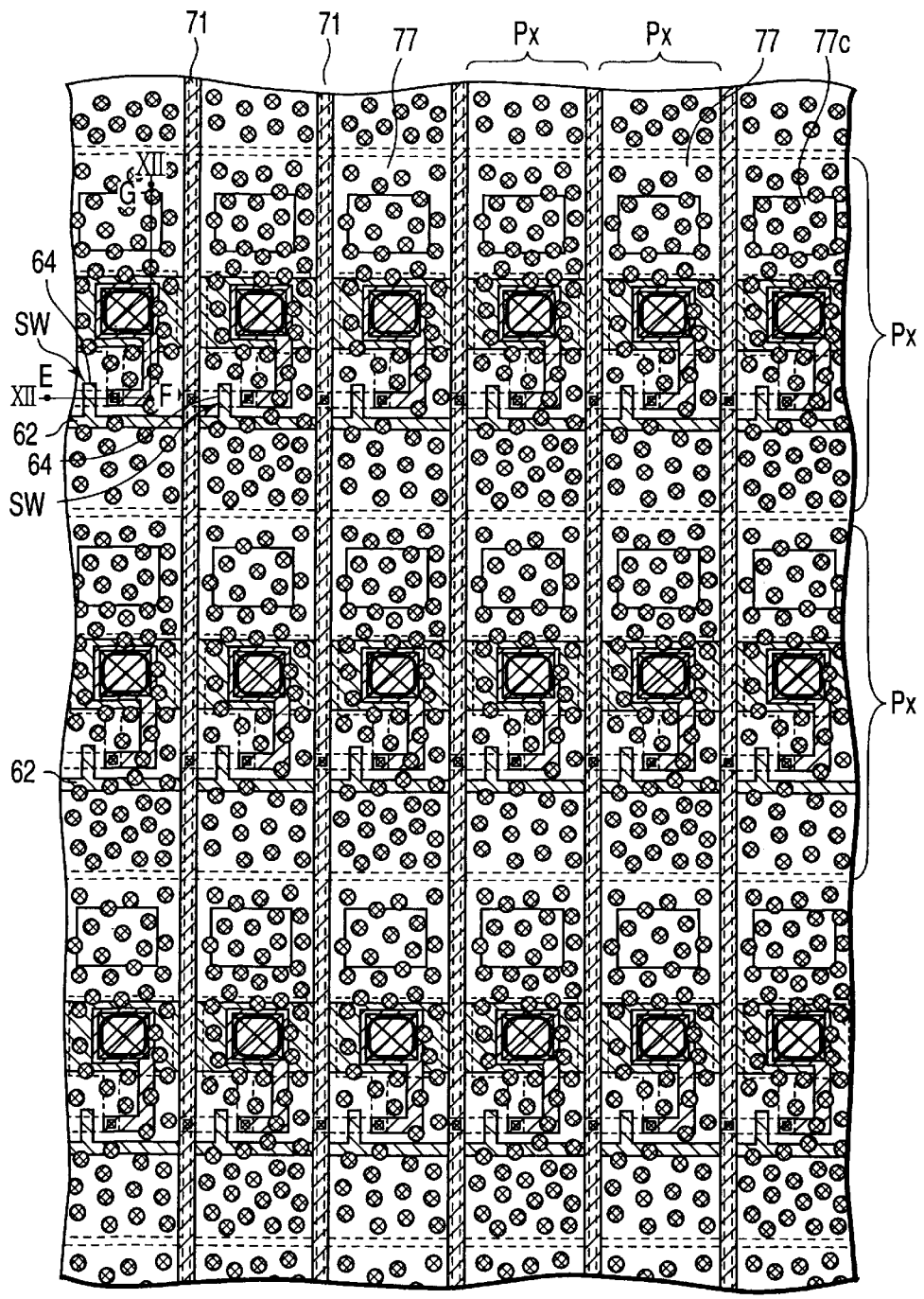
FIG. 11 is a view showing a partial plane structure of a semi-transmission type liquid crystal display device according to a third embodiment of the present invention.
Figure 12:
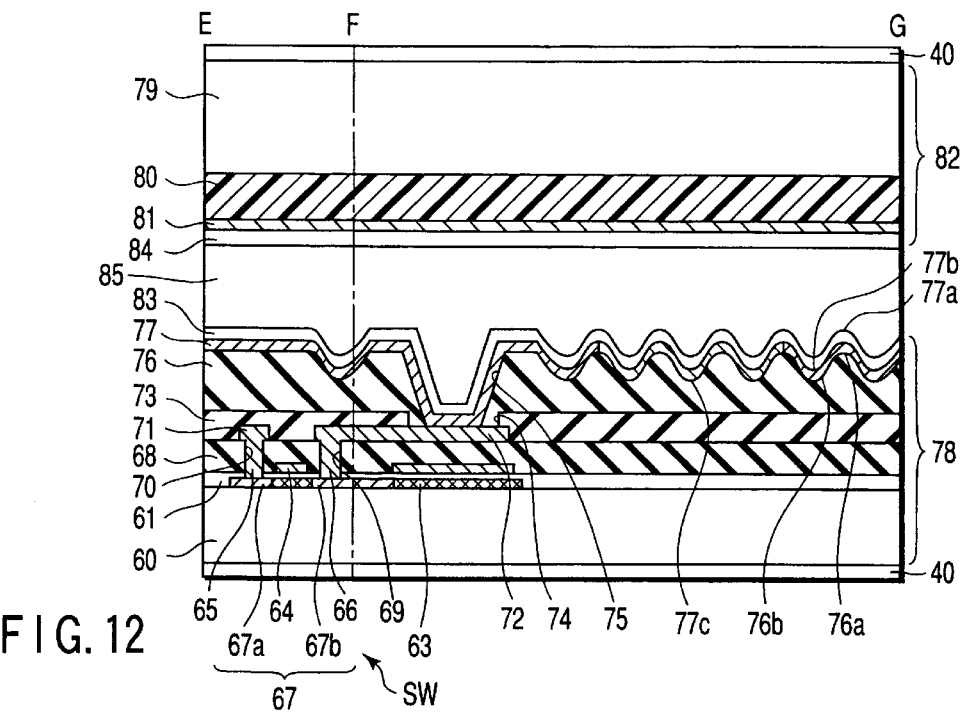
FIG. 12 is a view showing a sectional structure of a pixel region taken along the line XII—XII shown in FIG. 11.

FIG. 11 shows a partial plane structure of the semi-transmission type liquid crystal display device. FIG. 12 shows a sectional structure of a pixel region taken along the line XII—XII shown in FIG. 11. As shown in FIG. 12, the liquid crystal display device includes an array substrate 78, a counter substrate 82, and a liquid crystal layer 85 held therebetween. The same reference numerals as used in the first embodiment are used in FIGS. 11 and 12 to denote the same portions.

The array substrate 78 includes an insulation substrate 60, a plurality of pixel electrodes 77 arranged in a matrix manner, a plurality of signal lines 71 disposed along the columns of the pixel electrodes 77, a plurality of scanning lines 62 disposed along the rows of the pixel electrodes 77, a plurality of thin film transistors (TFT) SW each disposed near intersections of a corresponding scanning line 62 and a corresponding signal line 71 and serving as a pixel switching element, a drive circuit for driving the scanning lines 62 and the signal lines 71, and an alignment film 83 covering the pixel electrodes 77. The counter substrate 82 includes a light transmitting insulation substrate 79, a coloring layer 80 formed on the insulation substrate 79, a transparent counter electrode 81 covering the coloring layer 80, and an alignment film 84 covering the counter electrodes 81. The coloring layer 80 includes red, green, and blue striped color filers arranged in the row direction and each facing the pixel electrodes 77 of a corresponding column. Further, polarizing plates 40 are affixed to the insulation substrates 60 and 79 on sides opposite to the liquid crystal layer 85. In this reflection type liquid crystal display device, the liquid crystal layer 85 is partitioned into a plurality of pixel regions PX according to the pixel electrodes 77, each pixel region PX is located substantially between two adjacent scanning lines 62 and two adjacent signal lines 71. Each thin film transistor SW turns on in response to a scanning pulse supplied from a corresponding scanning line 62 to supply the potential of a corresponding signal line 71 to a corresponding pixel electrode 77. Each pixel electrode 77 applies the potential of a corresponding signal line 71 to a corresponding pixel region PX of the liquid crystal layer 85 as a pixel potential, thereby causing the transmittance of the pixel region PX to be controlled based on the difference between the pixel potential and the potential of the counter electrode 81. The drive circuit for the scanning lines 62 and the signal lines 71 includes a plurality of thin film transistors, which are formed in the same manner as the pixel switching elements, and the wirings thereof. These thin film transistors are of P- and N-channel types.

In the array substrate 78, each thin film transistor SW includes a semiconductor layer 67, a gate electrode 64 which is formed above the semiconductor layer 67, insulated from the same, and connected to a corresponding scanning line 62, and source and drain electrodes 66 and 65 which are formed in contact with the semiconductor layer 67 through contact holes 69 and 70 on both sides of the gate electrode 64 and connected to a corresponding pixel electrode 77 and a corresponding signal line 71, respectively. The semiconductor layer 67 is formed on the insulation substrate 60 and covered with a gate insulation film 61 together with the insulation substrate 60. The gate electrode 64 is insulated from the semiconductor layer 67 by the gate insulation film 61 and formed integrally with a corresponding scanning line 62 on the gate insulation film 61. Further, a plurality of storage capacitance lines 63 are formed on the gate insulation film 61 and capacitively coupled to the rows of the pixel electrodes 77, respectively. The gate electrodes 64, the scanning lines 62, and the storage capacitance lines 63 are covered with an interlayer insulation film 68 together with the gate insulation film 61. The contact holes 69 and 70 are formed in the interlayer insulation film 68 and the gate insulation film 61 to expose a source 67b and drain 67a formed in the semiconductor layer 67 on both sides of the gate electrode 64. The source and drain electrode 66 and 65 are formed on the interlayer insulation film 68 in contact with the source 67b and drain 67a of the semiconductor layer 67 exposed by the contact holes 69 and 70. The source electrode 66 is formed integrally with an extended source electrode 72 on the interlayer insulation film 68, the drain electrode 65 is formed integrally with the corresponding signal line 71 on the interlayer insulation film 68. The source electrode 66, the extended source electrode 72, the drain electrode 65, and the corresponding signal line 71 are covered with a protective insulation film 73 together with the interlayer insulation film 68. The protective insulation film 73 includes a contact hole 74 partially exposing the extended source electrode 72, and is covered with an organic insulation film 76. The organic insulation film 76 includes a contact hole 75 partially exposing the extended source electrode 72 within the contact hole 74 of the protective insulation film 73. The pixel electrode 77 is formed on the organic insulation film 76 in contact with that part of the extended source electrode 72 which corresponds to the contact holes 74 and 75, and covered with the alignment film 83.

Each of the pixel electrodes 77 includes a reflecting portion for scattering the light, which enters from the counter substrate 82 side through the liquid crystal layer 85, at a high reflectance, and a transmission region for transmitting the light from a back light with absorption. The pixel electrodes 77 are formed using the upper surface of the organic insulation film 76 as an underlayer. The organic insulation film 76 includes a plurality of projection-recess patterns having a plurality of semi-spherical projections 77a disposed at random in the range of one pixel region PX and a recess 77b disposed so as to surround these projections 77a. The light-transmitting portion electrodes 77c of the pixel electrodes 77 is a light-transmitting conductive film, for example, of ITO. Further, the reflecting portion electrodes of the pixel electrodes 77 contain a metal material such as, for example, silver, aluminum, or the alloys thereof, and are formed in a predetermined thickness along the projection-recess patterns of the organic insulation film 76. Accordingly, the reflecting portion of the each pixel electrode 77 includes a projection-recess pattern having semi-spherical projections 77a which are defined by the semi-spherical projections 77a of the organic insulation film 76 so as to be disposed at random in the range of a corresponding pixel region PX, and a recess 77b which is defined by the recess 77b of the organic insulation film 76 so as to surround the projections 77a. There are two types of the projection-recess patterns for the pixel electrodes 77 as shown by A and B in FIG. 3. Each projection-recess pattern is separated from another of the same type in the row and column directions of the pixel electrodes 77. In the projection-recess pattern of each pixel electrode, the plurality of projections 77a constitute main scattering portions to incident light, and the recess 77b constitutes a sub-scattering portion to the incident light.

Next, a manufacturing process of the aforementioned semi-transmission type liquid crystal display device will be described.

In the manufacture of the array substrate 78, a high strain-point glass plate or quartz plate is used as the insulation substrate 60. The semiconductor layers 67 are formed in such a manner that amorphous silicon is deposited on the insulation substrate 60 in a thickness of about 50 nm by CVD, annealed in a furnace at 450° C. for one hour, and crystallized as a poly-crystal silicon film by irradiation of an XeCl excimer laser, and then the poly-crystal silicon film is patterned by photo etching. The gate insulation film 61 is formed by depositing $SiO_x$ on the semiconductor layers 67 and the insulation substrate 60 in a thickness of about 100 nm by CVD. Subsequently, the gate electrodes 64, the scanning lines 62, the storage capacitance lines 63 and the gate electrodes and other wirings of the thin film transistors for the drive circuit are formed by depositing a single, multi-layered or alloy film of one or more materials selected from Ta, Cr, Al, Mo, W, Cu and the like, on the gate insulation film 61 in a thickness of about 400 nm and patterning it in a predetermined shape by photo etching.

Thereafter, an impurity such as phosphorus is doped into the semiconductor layer 67 by ion implantation or ion doping method with the gate electrodes 64 used as a mask. Here, phosphorus ions are accelerated in, for example, an atmosphere of $PH_3/H_2$ at an acceleration voltage of 80 keV and implanted at a high concentration of a dose of $5 \times 10^{15}$ atoms/cm$^2$. Thereafter, the drain electrodes 65 and the source electrodes 66 of the thin film transistors SW for the pixels and the source and drain electrodes of the N-channel thin film transistors for the drive circuit are formed.

Subsequently, the thin film transistors SW for the pixels and the N-channel thin film transistors for the drive circuit are covered with a resist so that impurities are not implanted thereto, and an impurity such as boron is doped with the gate electrodes of the P-channel thin film transistors for the drive circuit used as mask. Here, boron ions are accelerated in, for example, an atmosphere of $B_2H_6/H_2$ at an acceleration voltage of 80 keV and implanted at a high concentration of a dose of $5 \times 10^{15}$ atoms/cm$^2$. Then, the source electrodes and the drain electrodes of the P-channel thin film transistors are formed. Ion implantation of an impurity is carried out so as to obtain an LDD (lightly doped drain) structure in the N-channel thin film transistors SW. Thereafter, the ion-implanted regions are activated by annealing to form the sources 67b and the drains 67a.

The interlayer insulation film 68 is formed by depositing $SiO_2$ on the gate electrodes 64, the scanning lines 62, the storage capacitance lines 63, the other wirings for the drive circuit, and the gate insulation film 61 in a thickness of about 500 nm by, for example, PECVD. The interlayer insulation film 68 is patterned by photo etching so as to expose the sources 67b and the drains 67a of the semiconductor layer 67, thereby forming the contact holes 69 and 70.

A single, multi-layered or alloy film of one or more materials selected from Ta, Cr, Al, Mo, W, Cu and the like is deposited on the interlayer insulation film 68 in a thickness of about 500 nm and patterned in a predetermined shape by photo etching, thereby forming the signal lines 71, the source electrodes 66, the extended source electrodes 72, and the wirings for the drive circuit.

The protective insulation film 73 is formed by depositing $SiN_x$ on the wirings and the interlayer insulation film 68 by PECVD. The contact holes 74 are formed by patterning the protective insulation film 73 by photo etching.

A photosensitive resin, for example, is coated as the organic insulation film 76 on the protective insulation film 73 in a thickness of about 2 μm and partially exposed to light in a range corresponding to the contact holes 74 using a photomask for the contact holes 75. Further, the photosensitive resin is exposed to light using a photomask for the projection-recess patterns. This photomask has a plurality of circular light-shielding portions disposed in the range of each pixel region PX at random so as not to overlap the signal lines 71. Here, the amount of exposure for the projection-recess patterns is set to about 10% to 50% of the amount of exposure for the contact holes formed in the organic insulation film 76. In the same manner as the first embodiment, the photomask for the projection-recess patterns has a size of 2×2 pixels shown by thick lines in FIG. 3, and defines the projection-recess pattern A at pattern positions (1, 1) and (2, 2) and the projection-recess pattern B at pattern positions (2, 1) and (1, 2).

The organic insulation film 76 is subjected to development to remove the aforementioned exposed portions, thereby forming the plurality of projections 77a and the recess 77b on the organic insulation film 76 together with the contact holes 75. At this time, the projections 77a and the recess 77b are in an acute angle state. Thus, the array substrate 78 is subjected to heat treatment at, for example, 200° C. for about 60 minutes, thereby causing the surfaces of the projections 77a and the recess 77b to be rounded and smoothed.

The light-transmitting conductive film of ITO is deposited on the organic insulation film 76 in a thickness of about 50 nm by sputtering and patterned in a predetermined shape by photo etching, thereby forming the light-transmitting portions 77c of the pixel electrodes 77. Thereafter, a single, multi-layered or alloy film of one or more materials selected from Ta, Cr, Al, Mo, W, Cu and the like is deposited on the organic insulation film 76 in a thickness of about 200 nm by sputtering, and patterned in a predetermined shape by photo etching, thereby forming the reflecting portions of the pixel electrodes 77. The pixel electrodes 77 are in contact with the extended source regions 72 and capacitively coupled to the storage capacitance lines 63.

Subsequently, a plurality of columnar spacers are formed in predetermined regions to secure a predetermined gap defining the thickness of the liquid crystal layer 85. Then, the alignment film 83 is formed by a rubbing process of low temperature curing type polyimide which is coated by printing in a thickness of about 3 μm so as to cover the pixel electrodes 77 and the organic insulation film 76.

In the manufacture of the counter substrate 82, a high strain-point glass plate or quartz plate is used as the light transmitting insulation substrate 79, and the coloring layer 80, in which pigments are dispersed, is formed on the insulation substrate 79. The transparent counter electrode 81 is formed by depositing, for example, ITO on the coloring layer 80 by sputtering. Subsequently, the alignment film 84 is formed by a rubbing process of low temperature curing type polyimide coated by printing in a thickness of about 3 μm so as to cover the counter electrodes 81. Note that the alignment films 83 and 84 are rubbed in directions causing the alignment axes thereof to be offset by, for example, 70° to each other.

The array substrate 78 is integrated with the counter substrate 82 after the alignment films 83 and 84 are formed. Specifically, the array substrate 78 and the counter substrate 82 are opposed with the alignment films 83 and 84 disposed inside thereof and bonded to each other by a peripheral sealing member. The liquid crystal layer 85 is obtained by pouring a liquid crystal composition such as nematic liquid crystal poured into a liquid crystal pouring space serving as a cell surrounded and sealed by the peripheral sealing member between the array substrate 78 and the counter substrate 82. The polarizing plates 40 are affixed to the insulation substrates 60 and 79 on the sides opposite to the liquid crystal layer 85 in the state where the liquid crystal layer 85 is held between the array substrate 78 and the counter substrate 82. The semi-transmission type liquid crystal display device is completed as described above.

According to the semi-transmission type liquid crystal display device of the third embodiment, the reflection plate is composed of the plurality of pixel electrodes 77. Each pixel electrode 77 has one of the projection-recess patterns A and B. The projection-recess patterns A and B are formed in the pixel electrodes 77 in such a combination that each projection-recess pattern is not located next to another of the same type. That is, different types of projection-recess patterns are arranged side by side in each of the row and column directions of pixel regions PX, the interference of light that is scattered by projection-recess patterns A and B of the pixel electrodes 77 can be made irregular as a whole. As a result, difficulty in the observation of an image due to the interference of light can be reduced without impairing an excellent contrast.

Note that the layout of the patterns shown in FIG. 3 may be replaced with the layouts of the patterns shown in FIGS. 4 and 5 as the modification.

Figure 13:
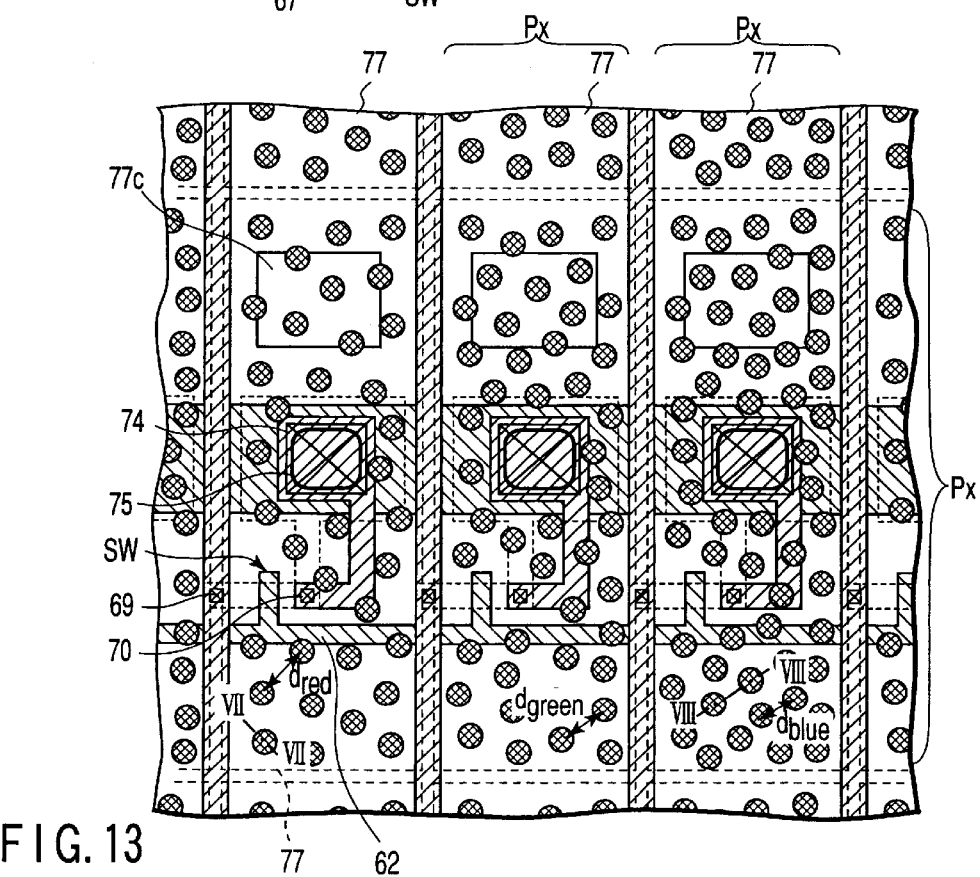
FIG. 13 is a view showing a partial plane structure of a semi-transmission type liquid crystal display device according to a fourth embodiment of the present invention.

Next, a semi-transmission type liquid crystal display device according to a fourth embodiment of the present invention will be described. FIG. 13 shows a partial plane structure of the semi-transmission type liquid crystal display device. The liquid crystal display device is arranged similarly to that of the third embodiment except the following arrangement. Thus, the same reference numerals as used in the third embodiment are used in FIG. 13 to denote the same portions, and the description thereof is omitted.

In this semi-transmission type liquid crystal display device, types of projection-recess patterns are formed in the pixel electrodes 77 of pixel regions PX for different display colors, respectively. The average pitch of the main scattering portions of each projection-recess pattern depends on the wavelength λ of the display color assigned to a corresponding pixel region PX. Specifically, the average pitch of the projections 77a disposed in each pixel electrode 77 at random is determined according to the wavelength λ of a corresponding filter color of the coloring layer 80.

The pixel electrodes 77 of an n-th column, the pixel electrodes 77 of an (n+1)-th column, and the pixel electrodes 77 of an (n+2)-th column face red, green, and blue color filters, respectively (n=1, 2, 3 . . .). These pixel electrodes 77 include, for example, projection-recess patterns R in each of which a plurality of projections 77a serving as red pixel main scattering portions are disposed at random at an average pitch of $d_{red}$, projection-recess patterns G in each of which a plurality of projections 77a serving as green pixel main scattering portions are disposed at random at an average pitch of $d_{green}$, and projection-recess patterns B in each of which a plurality of projections 77a serving as blue pixel main scattering portions are disposed at random at an average pitch of $d_{blue}$. Further, in each of the projection-recess patterns R, G, and B, a recess 77b serving as a sub-scattering portion is disposed so as to surround the projections 77a similarly to the first embodiment.

These average pitches $d_{red}$, $d_{green}$, and $d_{blue}$ are set such that they are shorter as the wavelengths λ of the colors of the color filters are shorter and set longer as they are longer. Thus, the relationship of $d_{red} > d_{green} > d_{blue}$ is established therebetween. Specifically, the average pitches are set such that white light, beams which enter from one direction, are reflected in different directions according to the respective wavelengths λ in the red, green and blue pixel regions, so that they can exit in the same direction in order to attain excellent color display of white.

Next, the locus of a light beam in a conventional reflection type liquid crystal display device in which a single type of projection-recess pattern is formed in all the pixel electrodes as shown in FIG. 17 will be compared with the locus of a light beam in the semi-transmission type liquid crystal display device of the fourth embodiment as shown in FIG. 13. As described in the second embodiment, FIG. 18 shows the locus of a light beam in the cross section of a red pixel region taken along the line XVIII—XVIII shown in FIG. 17, and FIG. 19 shows the locus of a light beam in the cross section of a blue pixel region taken along the line XIX—XIX shown in FIG. 17. In FIGS. 18 and 19, $n_1$ shows a refractive index in air, $n_2$ shows a refractive index of a liquid crystal material, $\theta_1$ shows an incident angle of incident light traveling from the outside to the liquid crystal layer, $\theta_2$ shows an exit angle of the incident light refracted by the liquid crystal layer and traveling to the pixel electrode, $\theta_3$ shows an inclination of the pixel electrode with respect to a horizontal plane, and $\theta_4$ shows an exit angle of the reflected light reflected by the pixel electrode and traveling to the outside of the liquid crystal layer, respectively. The exit angle $\theta_4$ has the following relationship with respect to the incident angle $\theta_1$, the inclination $\theta_3$, the refractive index $n_1$, and the refractive index $n_2$.

$$\sin\theta_4 = \sin\theta_1 \cos 2\theta_3 + \sin 2\theta_3 \sqrt{\left(\frac{n_2}{n_1}\right)^2 - \sin^2\theta_1}$$

The refractive index $n_2$ of the liquid crystal material is usually larger when a wavelength is shorter. Thus, the above formula shows that when the wavelength $\lambda$ is shorter, the exit angle $\theta_4$ is larger with respect to the incident light from the $\theta_1$ direction. That is, when the exit angle of the red component light is shown by $\theta_{4\ (red)}$ and the exit angle of blue component light is shown by $\theta_{4\ (blue)}$, there is established a relationship $\theta_{4\ (red)} > \theta_{4\ (blue)}$. Accordingly, when a single type of projection-recess pattern is formed in all the pixel electrodes regardless of display color, as in the conventional reflection type liquid crystal display device shown in FIG. 17, excellent color display of white cannot be achieved since the color components of reflected light are separately observed from a viewpoint on a line oblique to the liquid crystal layer.

In contrast, in the semi-transmission type liquid crystal display device of the fourth embodiment shown in FIG. 13, the projection-recess patterns R, G, and B are formed in the pixel electrodes 77 of the red, green, and blue pixel regions PX, respectively. Further, the average pitches of the main scattering portions of the projection-recess patterns R, G, and B depend on the wavelengths $\lambda$ of red, green, and blue which are the display colors of the respective pixel regions PX. The locus of a light beam in the cross section of a red pixel region taken along the line VII—VII shown in FIG. 13 is formed as shown in FIG. 7. The locus of a light beam in the cross section of a blue pixel region taken along the line VIII—VIII shown in FIG. 13 is formed as shown in FIG. 8. In FIGS. 7 and 8, $n_1$ shows a refractive index in air, $n_2$ shows a refractive index of a liquid crystal material, $\theta_1$ shows an incident angle of incident light traveling from the outside to the liquid crystal layer, $\theta_2$ shows an exit angle of the incident light refracted by the liquid crystal layer and traveling to the pixel electrode, $\theta_3$ shows an inclination of the pixel electrode with respect to a horizontal plane, and $\theta_4$ shows an exit angle of the reflected light reflected by the pixel electrode and traveling to the outside of the liquid crystal layer, respectively. The pitch of the projections 77a in FIG. 7 is longer than that in FIG. 8. The difference of height between the projections 77a and the recess 77b is not varied with the pitch. However, a longer pitch can make the maximum value of the inclination $\theta_3$ of the pixel electrode 77 smaller with respect to the horizontal plane. That is, when the pitch, which prescribes the inclination $\theta_3$ of the pixel electrodes 77, is set longer to obtain the inclination $\theta_3'$ of the pixel electrode 77, the inclinations $\theta_3$ and $\theta_3'$ have a relationship $\theta_3' < \theta_3$. Thus, the exit angles can be set to a substantially constant value that does not depend on the display color, by selecting a pitch for each display color from the relationship of the above formula so as to establish a relationship of exit angle $\theta_{4\ (red)}$ of the red component light=exit angle $\theta_{4\ (blue)}$ of the blue component light. With this structure, excellent color display of white can be achieved without causing the color components of reflected light to be separately observed from a viewpoint on a line oblique to the liquid crystal layer 85.

A projection-recess pattern photomask has a size of 1×3 pixels as shown by thick lines in FIG. 9 in the same manner as the second embodiment, and defines a projection-recess pattern R at a pattern position (1, 1), a projection-recess pattern G at a pattern position (1, 2), and a projection-recess pattern B at a pattern position (1, 3). As shown by, for example, an arrow of FIG. 9, exposure is performed while shifting the photomask at a pitch of three pixels in the row direction of the pixel electrodes 77. In this case, each time the photomask reaches a final pixel electrode 77 of each row, it is further shifted in the column direction of the pixel electrodes 77 by one pixel.

According to the semi-transmission type liquid crystal display device of the fourth embodiment, an effect similar to that of the reflection type liquid crystal display device of the second embodiment can be obtained. That is, the projection-recess patterns R, G, and B are formed in the plurality of pixel electrodes 77 in such a combination that each projection-recess pattern are not located next to another of the same type. With this arrangement, the interference of light that is scattered by the projection-recess patterns R, G, and B of the pixel electrodes 77 can be made irregular as a whole. Therefore, difficulty in the observation of an image due to the interference of light can be more reduced without impairing an excellent contrast. Further, the average pitches of the main scattering portions of the projection-recess patterns R, G, and B, that is, the average pitches of the projections 77a are determined according to the wavelengths $\lambda$ of red, green, and blue color filters, respectively such that the exit angles $\theta_4$ coincide with each other. Thus, excellent color display of white can be achieved without causing the color components of reflected light to be separately observed from a viewpoint on a line oblique to the liquid crystal layer 85.

Note that the combination and the layout of the projection-recess patterns shown in FIG. 9 may be replaced with those of a modification shown in FIG. 10. This modification is applied to a case where the red, green, and blue filters are arranged in a matrix manner in place of a striped manner, as described in the second embodiment. According to this modification, even if the display colors of the pixel regions PX are different in each column, an effect similar to that of the fourth embodiment can be obtained.

Note that the present invention is not limited to the aforementioned embodiments and may be modified within the spirit or scope thereof.

Figure 14:
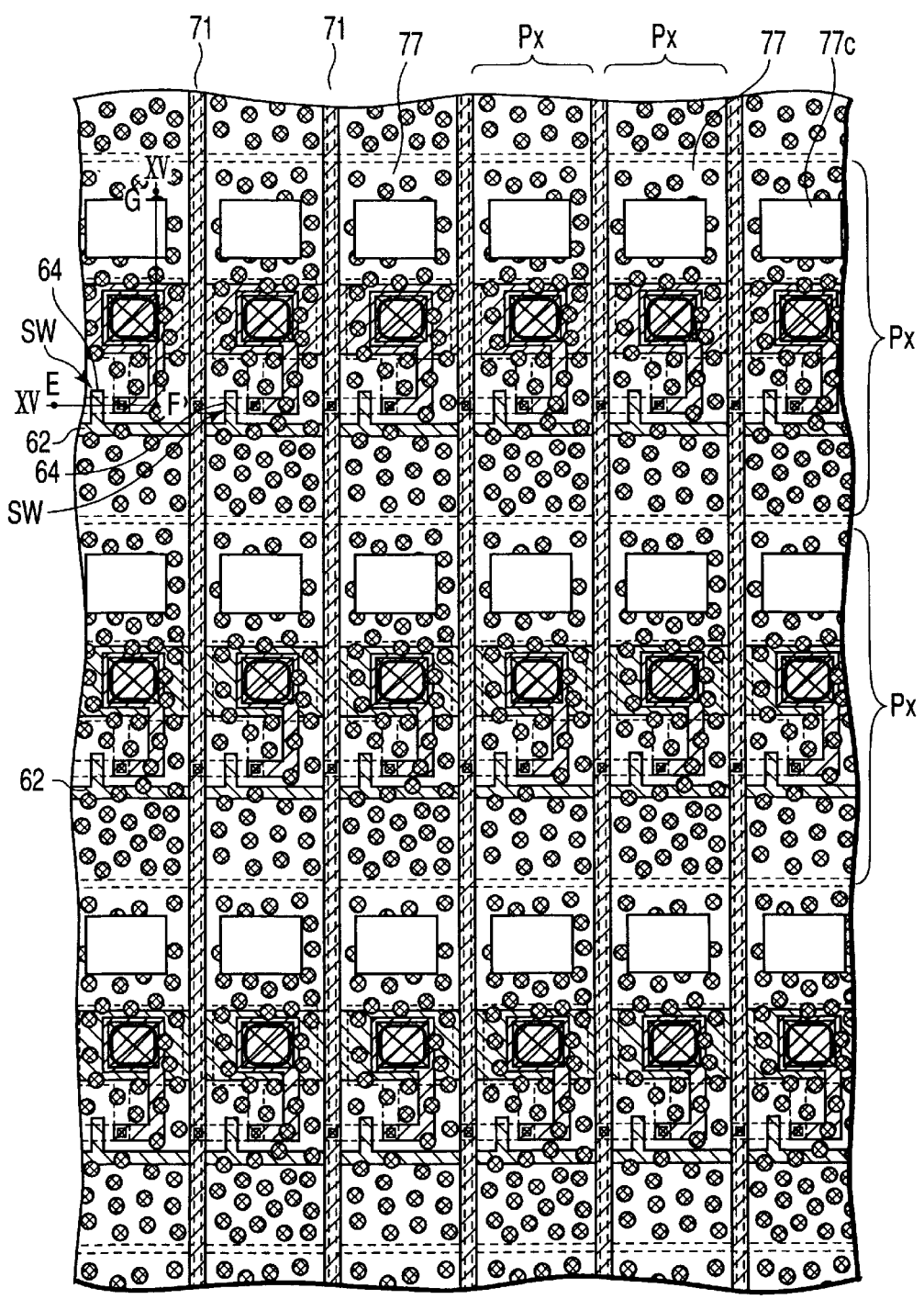
FIG. 14 is a view showing a partial plane structure of a modification of the semi-transmission type liquid crystal display device shown in FIG. 11.
Figure 15:
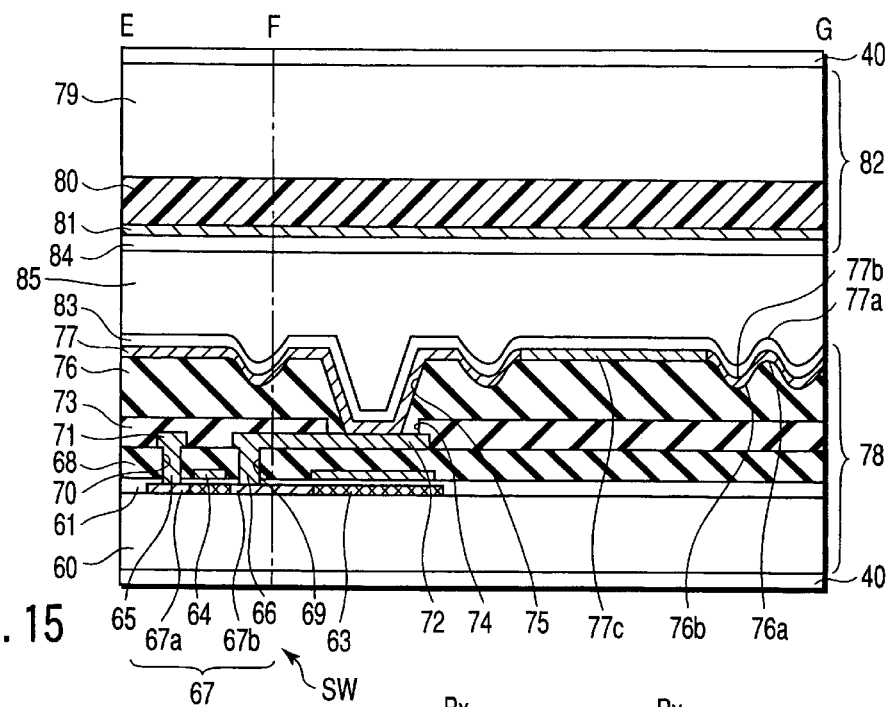
FIG. 15 is a view showing a sectional structure of a pixel region taken along the line XV—XV shown in FIG. 14.
Figure 16:
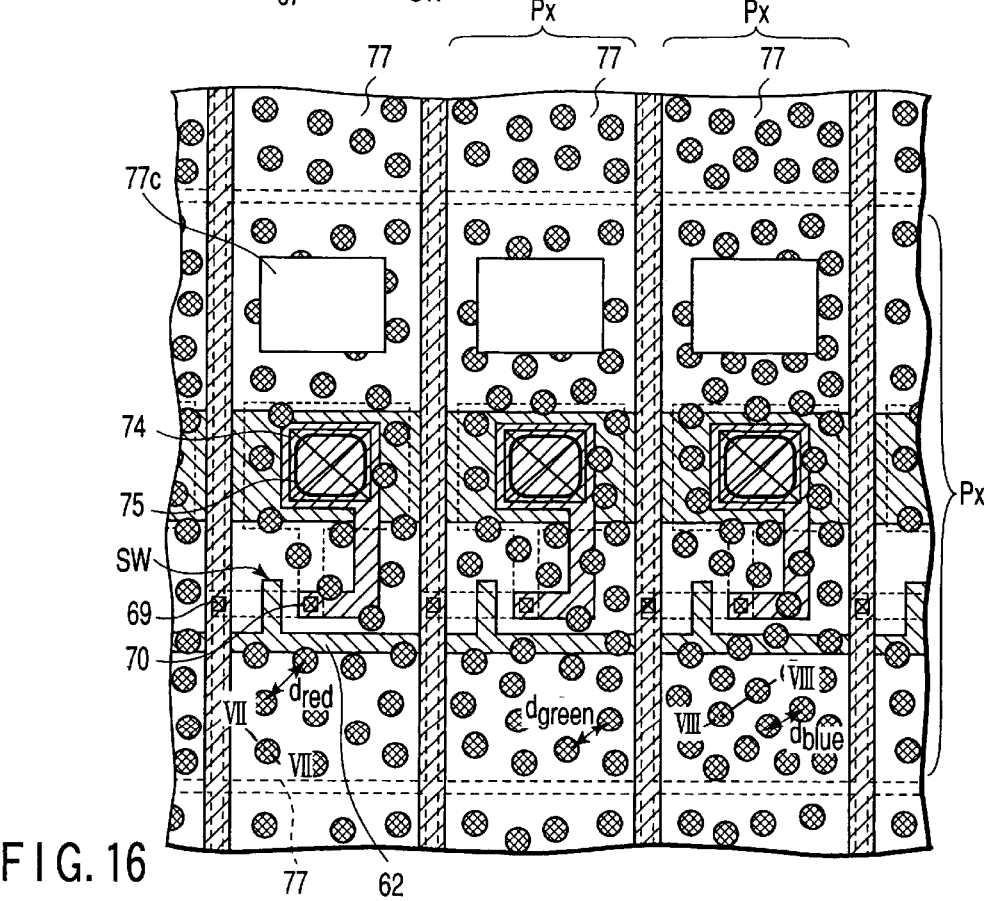
FIG. 16 is a view showing a partial plane structure of a modification of the semi-transmission type liquid crystal display device shown in FIG. 13.

For example, the light-transmitting portions 77c of the third embodiment may be formed flat by partially removing the projection-recess patterns of the organic insulation film 76 as shown in FIGS. 14 and 15. Further, the light-transmitting portions 77c of the fourth embodiment may be formed flat in the same manner as shown in FIG. 16.

The organic insulation film 76 of the first to fourth embodiments may have a plurality of projection-recess patterns each of which is composed of a plurality of semi-spherical recesses disposed at random in the range of each pixel region PX and a projection disposed so as to surround these recesses. In this case, each pixel electrode 77 has a projection-recess pattern composed of the plurality of semi-spherical recesses, which are prescribed by the plurality of semi-spherical recesses of the organic insulation film 76 so as to be disposed at random in the range of a corresponding pixel region PX, and the projection, which is prescribed by the projection of the organic insulation film 76 so as to surround these recesses. Accordingly, in the projection-recess patterns of the respective pixel electrodes 77, the plurality of recesses constitute main scattering portions to incident light, and the projection constitutes a sub-scattering portion to the incident light.

While the semiconductor layer 67 of each thin film transistor SW is composed of polysilicon, it may be composed of amorphous silicon. In addition to the above-mentioned, the present invention also applicable to a simple matrix reflection type or semi-transmission type liquid crystal display device which does not have pixel switching elements such as the thin film transistors SW.

Further, when it is sufficient only to make the interference of scattering light irregular, each projection-recess pattern may be allocated to at least one adjacent pixel region PX, specifically, to at least one adjacent pixel electrode 77 under the condition that the projection-recess pattern of each type is separated from another of the same type in at least one of the row and column directions of the pixel regions. Further, three types of projection-recess pattern selected from four types of projection-recess pattern may be combined and arranged in place of all the types of projection-recess patterns being combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display device, comprising:
   first and second electrode substrates;
   a liquid crystal layer held between said first and second electrode substrates and partitioned into a plurality of pixel regions in each of which the alignment of liquid crystal molecules is controlled from said first and second electrode substrates; and
   a reflection plate which is formed on said first electrode substrate and scatters light entering through said second electrode substrate and said liquid crystal layer;
   wherein said plurality of pixel regions are arrayed in a matrix of rows and columns, said reflection plate has types of projection-recess patterns each of which is separated from another of the same type in at least one of the row and column directions of said pixel regions and includes a plurality of main scattering portions disposed at random and a sub-scattering portion disposed to surround said main scattering portions, said types of projections-recess patterns are assigned to the pixel regions of different display colors, and the average pitch of the main scattering portions of each projection-recess pattern depends on the wavelength of the display color of a corresponding pixel region.

2. The liquid crystal display device according to claim 1, wherein said main scattering portions are one of a projection and a recess, and said sub-scattering portion is the other of said projection and said recess.

3. The liquid crystal display device according to claim 1, wherein said reflection plate includes a plurality of pixel electrodes formed on said first electrode substrate and assigned to said plurality of pixel regions, and each projection-recess pattern is formed in at least one corresponding pixel electrode selected from said pixel electrodes.

4. The liquid crystal display device according to claim 3, wherein each projection-recess pattern is defined according to the shape of an organic insulation film formed as an underlayer of a corresponding pixel electrode.

5. The liquid crystal display device according to claim 1, wherein said types of projection-recess patterns are arranged such that a combination thereof is repetitive in said pixel regions.

6. The liquid crystal display device according to claim 1, wherein said projection recess patterns are of two types.

7. The liquid crystal display device according to claim 1, wherein said projection recess patterns are of three types.

8. The liquid crystal display device according to claim 1 wherein each of said projection recess patterns is separated from another of the same type in each of the row and column directions of said pixel regions.

9. The liquid crystal display device according to claim 1, wherein said reflection plate includes a light-transmitting portion which transmits light therethrough.

10. The liquid crystal display device according to claim 9, wherein said main scattering portions are one of a projection and a recess, and said sub-scattering portion is the other of said projection and said recess.

11. The liquid crystal display device according to claim 9, wherein said reflection plate includes a plurality of pixel electrodes formed on said first electrode substrate and assigned to said plurality of pixel regions, and each projection-recess pattern is formed in at least one corresponding pixel electrode selected from said pixel electrodes.

12. The liquid crystal display device according to claim 11, wherein each projection-recess pattern is defined according to the shape of an organic insulation film formed as an underlayer of a corresponding pixel electrode.

13. The liquid crystal display device according to claim 9, wherein said types of projection-recess patterns are arranged such that a combination thereof is repetitive in said pixel regions.

* * * * *